Aug. 19, 1958 R. B. BENNETT 2,848,507
METHOD FOR CYCLIC HYDROCARBON CRYSTALLIZATION AND SEPARATION
Filed Dec. 7, 1953

INVENTOR.
Rufus B. Bennett,
BY
ATTORNEY.

United States Patent Office 2,848,507
Patented Aug. 19, 1958

2,848,507

METHOD FOR CYCLIC HYDROCARBON CRYSTALLIZATION AND SEPARATION

Rufus B. Bennett, Baytown, Tex., assignor, by mesne assignments, to Esso Research and Engineering Company, Elizabeth, N. J., a corporation of Delaware Application December 7, 1953, Serial No. 396,674

17 Claims. (Cl. 260—666)

The present application is directed to a procedure for crystallizing and separating a crystallizable organic compound from a normally liquid mixture of organic compounds.

In accordance with the present invention, a continuous body of slurry made up of crystals of a crystallizable organic compound in mother liquor consisting of a mixture of organic compounds is maintained in two zones of differing crystal content (referred to in the claims as two phases of a crystal holding zone) a first zone (first phase) having a content of crystals (crystal density) within the range of 24 to 60 volume percent and a second zone (second phase) having a substantially lower crystal content (crystal density) and a total content of said compound in crystals and mother liquor no greater than the content of said organic compound in the feed stock. The feed stock is chilled to such a temperature that 5 to 20% of solids, based on the feed stock, is then crystallized out and introduced into said first zone in said body of slurry so that it comes into contact with a slurry of high crystal content and remains in this zone for a sufficient time to provide an opportunity for crystal formation and growth and material from said first zone passes to said second zone and is withdrawn therefrom at the same rate that feed stock is introduced into said first zone.

The invention will now be described in greater detail in conjunction with the drawing in which.

The percent concentrations referred to throughout the following specification are volume percentages unless otherwise indicated.

For the sake of simplicity, the invention is further explained by means of the system in which paraxylene is recovered by crystallization from a hydrocarbon solution comprising mixed xylenes.

Figure 1:
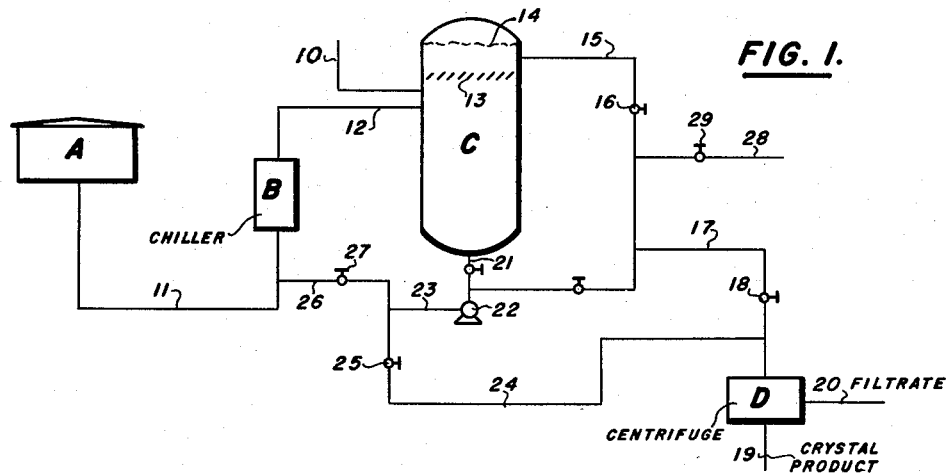
Fig. 1 is in the form of a diagrammatic flow sheet illustrating one method for practicing the present invention.

Turning now specifically to the drawing and first to Fig. 1, a feed stock containing paraxylene as the selected organic compound is withdrawn from charge tank A and passed through line 11 to chiller B. The paraxylene content of the feed is such that when the feed is chilled in zone B crystals in the range of 5% to 20% based on the feed are crystallized out. Chilled slurry is withdrawn from chiller B, passed through line 12 and discharged into crystallizing tank C at a point below the partition 13 which is shown as made up of a series of baffles. The partition 13 is arranged so that it divides crystallizing vessel C into two zones, a lower zone below partition 13 and an upper zone above partition 13 and so that while slurry may pass from one zone to the other the concentration of crystals in the slurry below partition 13 is much greater than the concentration above it.

Crystallizing vessel C contains a slurry consisting of paraxylene crystals in mother liquor with the upper surface of the slurry shown as 14 and well above baffles 13. The slurry below baffles 13 has a paraxylene crystal content within the range of 24 to 60 volume percent while the slurry above partition 13 has a total paraxylene content no greater than the paraxylene content of the feed stock. If the crystallizing vessel C is maintained at a temperature of —95° F. the feed stock with an initial paraxylene content of approximately 16% results in a slurry containing approximately 9% paraxylene crystals and the slurry above baffles 13 will have a paraxylene crystal content no greater than this.

From crystallizing vessel C slurry may be withdrawn from the upper zone above partition 13 by means of draw-off line 15 controlled by valve 16. If said slurry has a total paraxylene content identical to the paraxylene content of the feed stock introduced by line 12, it may be passed from line 15 through branch line 17 controlled by valve 18 to centrifuge D and there separated into a filter cake fraction removed through outlet line 19 and a filtrate fraction removed through outlet line 20. If the paraxylene content of the slurry removed from the upper zone above partition 13 has a total paraxylene content lower than the feed, slurry of high paraxylene content below baffles 13 may be removed through outlet line 21 and passed through pump 22, discharge line 23 and branch line 24 controlled by valve 25 for admixture with the slurry in line 17 to adjust the total paraxylene content going to the centrifuge to equal the total paraxylene content introduced into crystallization vessel C.

In order to assist in the formation of crystals in the incoming feed stock it may be desirable to seed the fresh feed in line 11; this may be done by withdrawing from vessel C slurry from the dense phase below partition 13 through line 21, pump 22, line 23 and branch line 26 controlled by valve 27 into the fresh feed stock flowing through line 11.

When starting up the system any one of several procedures may be used to build up the paraxylene crystal content in the lower zone in vessel C to the desired range of 24 to 60 volume percent. If desired, paraxylene crystals may be introduced from a suitable extraneous source by means of inlet line 10. Another method is to build up the concentration within the vessel from a relatively low paraxylene content feed stock by chilling the feed in chiller B, introducing it through line 12 into vessel C below partition 13 and there allowing gravity settling to take place so that the slurry above partition 13 has a total paraxylene content less than that of the introduced feed stock, this paraxylene slurry being withdrawn at the same rate feed is introduced into vessel C and discarded by means of line 15 controlled by valve 16 and outlet line 28 controlled by valve 29. Slurry is discarded through outlet line 28 until the paraxylene crystal content in vessel C below the partition 13 is within the desired range after which valve 29 may be closed and the system operated in the manner as heretofore described.

Figure 2:
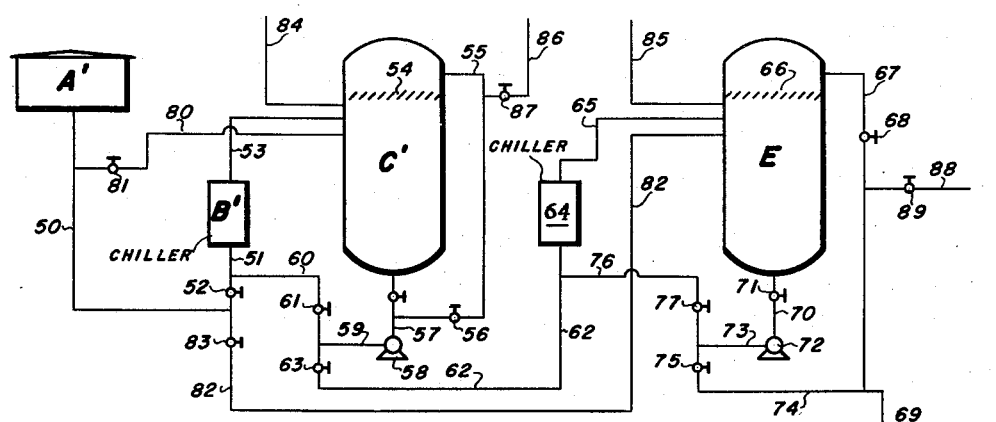
Fig. 2 is in the form of a diagrammatic flow sheet illustrating another method for practicing the present invention; and, Fig. 3 is a fragmentary view illustrating another form of crystallizing vessel which may be substituted for that of Fig. 1 and for one or both of those of Fig. 2.

Another method for carrying out the present invention is by the use of two crystallization vessels as illustrated in Fig. 2. In this procedure a suitable paraxylene containing feed stock from tank A' is passed through line 50, and through branch line 51 controlled by valve 52 to chiller B' and there chilled, with the chilled mixture passed through line 53 into crystallizing vessel C' at a point below partition 54 which is made up of baffles. The slurry of paraxylene crystals and mother liquor in vessel C' is divided into two zones, a lower zone below partition 54 where the paraxylene crystal content is within the range of 24 to 60 volume percent and an upper less dense phase above partition 54 where the total paraxylene content is no greater than that of the incoming feed stock. Slurry from the upper zone above partition 54 is withdrawn through line 55 controlled by valve 56 and passed to outlet line 57, pump 58, and discharge line 59 where the stream is split with a portion being passed through branch line 60 controlled by valve 61 to fresh feed in line 51 to seed said fresh feed with paraxylene crystals and the other portion passing through branch line 62 controlled by valve 63 to chiller 64 and thence through line 65 into second crystallizing vessel E.

Crystallizing vessel E is provided with partition 66 made up of baffles so that the paraxylene slurry below partition 66 forms a dense zone having a paraxylene crystal content within the range of 24 to 60 volume percent and a second zone above partition 66 in which the total paraxylene content is no greater than that of the incoming feed. Paraxylene slurry may be removed from the upper zone through outlet line 67 controlled by valve 68. If the paraxylene content from the upper zone is identical to the paraxylene content of the feed introduced into vessel E this slurry in line 67 may be sent through branch line 69 as the total feed for centrifuge D' with the system remaining in balance. However, if the paraxylene content of the slurry withdrawn through line 67 is less than that of the feed the high paraxylene content slurry may be withdrawn from the lower zone in vessel E through outlet line 70 controlled by valve 71 and pumped by pump 72 through line 73 and branch line 74 controlled by valve 75 for admixture with the slurry withdrawn from the top of vessel E by line 67, the total mixture being sent to the centrifuge D' and having a total paraxylene content identical to the total paraxylene content of the feed introduced into vessel E.

It will usually be desirable to seed the feed stock being introduced into vessel E and such seed crystals may be introduced from the lower portion of vessel E by means of line 70, pump 72, line 73 and branch line 76 controlled by valve 77.

At times it may be desirable to introduce feed from stock tank A' directly into first crystallizing tank C' without chilling. This may be done by means of line 50 and branch line 80 controlled by valve 81. At times it may also be desirable to introduce fresh feed directly into vessel E in addition to the slurry introduced thereinto by line 65 and such feed may be introduced by way of line 50 and branch line 82 controlled by valve 83.

When starting up the system shown in Fig. 2, any one of several procedures may be used to build up the paraxylene crystal content in the lower zones of tanks C' and E to the desired range of 24 to 60 volume percent. As one procedure, paraxylene crystals may be introduced from an extraneous source into crystal tank C' by means of inlet line 84 and into tank E at a point below baffles 66 by means of inlet line 85. As an alternative procedure, the crystal content in tank C' below baffles 54 may be built up by introducing feed slurry into the tank through inlet line 53, withdrawing slurry of a lower total paraxylene content than the feed slurry from the upper zone above baffles 54 by means of line 55 and discarding through outlet line 86 controlled by valve 87, and similarly the crystal content in vessel E may be built up by the introduction of feed into vessel E by means of inlet line 65 below partition 66 with slurry of lower paraxylene content than the feed slurry withdrawn through line 67 and discarded through outlet line 88 controlled by valve 89.

Figure 3:
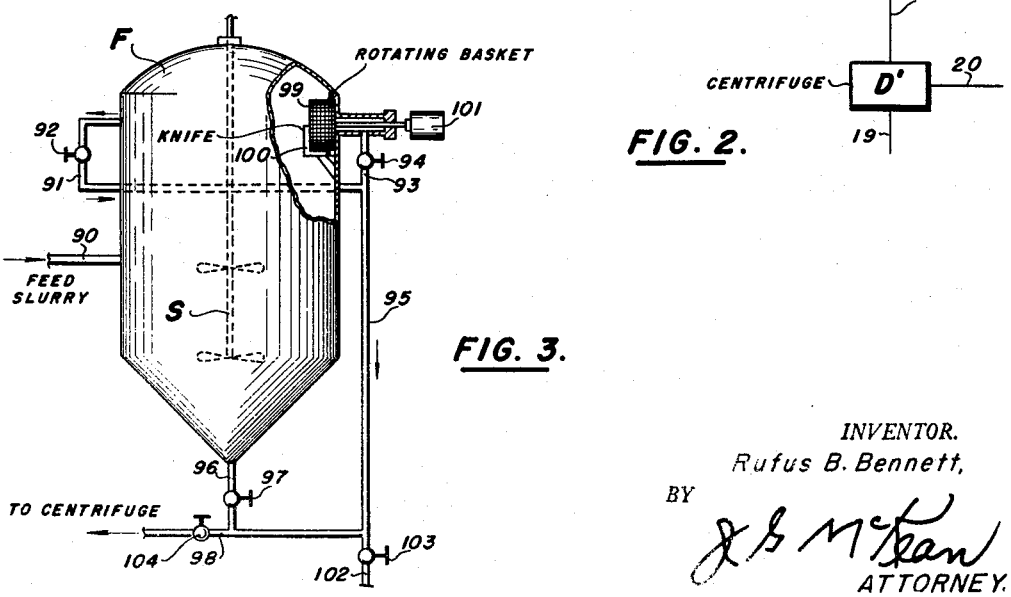

Instead of the vessels provided with baffles as shown in Figs. 1 and 2 for insuring the maintenance of a dense phase and a less dense phase which phases may be separately withdrawn from the vessel, other types of apparatus may be employed. Such a modification is shown in Fig. 3. In Fig. 3, vessel F is provided with a feed line 90; open side drawoff line 91 controlled by valve 92; filtered side drawoff line 93 controlled by valve 94; and bottom drawoff line 96 controlled by valve 97. All three drawoff lines connect into line 98 controlled by valve 104. Line 98 leads to a pump and centrifuge. The entrance to drawoff line 93 is protected by a small rotary filter 99, continuously rotated by prime mover 101 which may be a motor with gear reduction to turn the filter at about 1 R. P. M., and adhering crystals are continuously scraped from the filter by knife 100.

Vessel F may be substituted for vessel C in Fig. 1 and for either or both of vessels C' and E in Fig. 2. Vessel F is particularly designed to facilitate startup operation. In starting up, valves 92 and 97 are closed, valve 94 is open, and motor 101 is operating. Slurry is introduced through line 90 and, once the liquid level reaches the drawoff line, clear liquor is withdrawn through filtered drawoff line 93. This liquor may be discarded from the system via valved line 102, line 98 being closed by valve 104. As the operation proceeds, the crystal density in vessel F increases. By turning stirrer S at a suitable rate, a slurry of reasonable uniformity is maintained in the lower part of the vessel, and a relatively thin slurry in the upper part. Once the desired crystal density is reached, valves 92 and 104 may be opened and valves 94 and 103 closed to withdraw slurry to the centrifuge. It is evident that valves 92, 94 and 97 may be manipulated to maintain in line 98 a paraxylene concentration equal to that in line 90. For example, clear liquor could be withdrawn through line 93 and combined with thick slurry from line 96. Or the slurry withdrawn from line 91 could be thinned by adding clear liquor from line 93, or thickened by adding thick slurry from line 96.

The use of vessel F in Fig. 1 or Fig. 2 would permit continuous withdrawal of clear liquor from the system through valve 103, thus permitting this quantity of liquor to bypass the centrifuge.

The present invention is applicable to a wide variety of separations. A few of the systems in which it may be employed are given in the following examples:

*Example 1*

An aromatic hydrocarbon fraction boiling between 365° and 425° F., containing 10% of durene (1,2,4,5 tetramethyl benzene) is chilled to about −60° F. to give a slurry of about 6% durene crystals. In the operation according to Fig. 1, the crystal density in tank C is maintained between 24 and 35% solids. Durene of about 70% purity is recovered; the first cake is recrystallized and centrifuged to 95% purity.

*Example 2*

A naphthenic hydrocarbon fraction containing 85 mol percent (81.5 volume percent) cyclohexane is chilled in chiller B of Fig. 1 to −50° F. The slurry so formed contains 11.8 mol percent (11.3 volume percent) of cyclohexane crystals. This may be thickened in tank C to about 35% solids. Cyclohexane of 95% or better purity is recovered through line 19.

*Example 3*

An aromatic fraction containing 35 mol percent (24.4 volume percent) benzene is chilled in chiller B to −90° F. to produce a slurry containing 5.8 mol percent (4.1 volume percent) benzene crystals. The slurry concentration in tank C is maintained at 35% solids. Benzene of 95% purity is produced.

*Example 4*

A feed containing 45% orthoxylene, admixed mainly with metaxylene, is chilled to −75° F. in chiller B to produce a slurry of 12.7% solids content. The slurry concentration in tank C is maintained at 35%. Product containing 95% orthoxylene is withdrawn through line 19.

Example 5

A hydrocarbon solution containing 15% naphthalene is chilled to −60° F. to produce a slurry of about 10% solids content. The concentration of the slurry in tank C is maintained at 30 to 60% at −60° F.

What is desired to be secured by Letters Patent is:

1. A continuous process for recovering a normally liquid cyclic hydrocarbon compound crystallizable at a crystallization temperature no less than −95° F. from a feed stock consisting of a liquid mixture of organic hydrocarbon compounds including said cyclic compound which comprises the steps of continuously chilling a stream of said feed stock in a chilling zone to a crystallization temperature no less than −95° F. to partially crystallize said cyclic compound to provide a slurry or 5 to 20 volume percent of crystals of said cyclic compound in a mother liquor containing said cyclic compound in liquid form, continuously introducing said slurry to the first phase of a two phase slurry holding zone comprising a first phase of greater crystal density having a 25 to 60 volume percent content of crystals of said cyclic compound and a second phase of lesser crystal density having a total content of crystallized and liquid cyclic compound no greater than the initial liquid content of said cyclic compound in said feed stock, a portion of the crystals from the first phase passing to the second phase, said slurry holding zone being maintained at said crystallization temperature and said second phase being maintained quiescent, continuously removing mother liquor and crystals of said cyclic compound from the first phase and from the second phase of said slurry holding zone, separating said removed crystals and said removed mother liquor from the first phase into a filter cake fraction and a filtrate fraction, said crystals and mother liquor being withdrawn from the second phase of said slurry holding zone at a rate equal to the rate of charge of said slurry to the first phase of said slurry holding zone, the ratio of withdrawn crystals to withdrawn mother liquor from the second phase being such that said cyclic compound is withdrawn from said slurry holding zone at a rate substantially equal to the rate of charge of said selected compound to said slurry holding zone.

2. A process as in claim 1 wherein the feed stock comprises a mixture of xylenes, wherein the cyclic compound is paraxylene and wherein the crystallization temperature is approximately −95° F.

3. A process as in claim 2 wherein the said feed stock contains approximately 16 volume percent of paraxylene, wherein the feed stock is continuously chilled to form a slurry having a crystal density of approximately 9 percent by volume and wherein the crystal density in the second phase of the slurry holding zone is no greater than the crystal density of the said slurry.

4. A process as in claim 1 wherein the feed stock is a durene-containing aromatic fraction boiling between 365° and 425° F., wherein the cyclic compound is durene and wherein the crystallization temperature is approximately −60° F.

5. A process as in claim 4 wherein the said feed stock contains approximately 10 volume percent of durene, wherein the said feed stock is continuously chilled to form a slurry having a crystal density of approximately 9 volume percent and wherein the crystal density in the first phase of the slurry holding zone is maintained in the range of about 24 to 35 volume percent.

6. A process as in claim 1 wherein the feed stock comprises a cyclohexane-containing naphthenic hydrocarbon fraction, wherein the cyclic compound is cyclohexane and wherein the crystallization temperature is approximately −50° F.

7. A process as in claim 6 wherein the said feed stock contains approximately 81.5 volume percent of cyclohexane, wherein the feed stock is continuously chilled to form a slurry having a crystal density of about 11.8% by volume and wherein the crystal density in the second phase of the slurry holding zone is about 35 volume percent.

8. A process as in claim 1 wherein the feed stock is a benzene-containing aromatic fraction, wherein the cyclic compound is benzene and wherein the crystallization temperature is approximately −90° F.

9. A process as in claim 8 wherein the said feed stock contains approximately 25 volume percent of benzene, wherein the feed stock is continuously chilled to form a slurry having a crystal density of approximately 5.8 volume percent and wherein the crystal density in the first phase of the slurry holding zone is maintained at about 35 volume percent.

10. A process as in claim 1 wherein the feed stock comprises orthoxylene admixed mainly with metaxylene, wherein the cyclic compound is orthoxylene and wherein the crystallization temperature is approximately −75° F.

11. A process as in claim 10 wherein the said feed stock contains approximately 45 volume percent of orthoxylene wherein the feed stock is continuously chilled to form a slurry having a crystal density of approximately 12.7 volume percent and wherein the crystal density in the first phase of the slurry holding zone is maintained at about 35 volume percent.

12. A continuous process for recovering a normally liquid cyclic hydrocarbon compound crystallizable at a crystallization temperature no less than −95° F. from a feed stock consisting of a liquid mixture or organic hydrocarbon compounds including said cyclic compound which comprises the steps of continuously chilling a stream of said feed stock in a chilling zone to a crystallization temperature no less than −95° F. to partially crystallize said cyclic compound to provide a slurry of 5 to 20 volume percent of crystals of said cyclic compound in a mother liquor containing said cyclic compound in liquid form, continuously introducing said slurry to the first phase of a two phase slurry holding zone comprising a first phase of greater crystal density having a 25 to 60 volume percent content of crystals of said cyclic compound and a second phase of lesser crystal density having a total content of crystallized and liquid cyclic compound no greater than the initial liquid content of said cyclic compound in said feed stock, a portion of the crystals from the first phase passing to the second phase, said slurry holding zone being maintained at said crystallization temperature and said second phase being maintained quiescent, continuously removing a stream of mother liquor and crystals of said cyclic compound from said first phase and continuously removing a separate stream of mother liquor and crystals from said second phase of said slurry holding zone, discarding a portion of said separate stream from the second phase combining the other portion of said stream from the second phase with the stream from the first phase, and separating said thus removed crystals and mother liquor of said combined streams into a filter cake fraction and a filtrate fraction, said crystals and mother liquor being withdrawn from said first and second phases at a rate equal to the rate of charge of said slurry to said slurry holding zone, the rate of withdrawal of said crystals from said first phase and the rate of withdrawal of mother liquor and crystals from said first and second phases being such that said cyclic compound is withdrawn from said slurry holding zone at a rate substantially equal to the rate of charge of said cyclic compound to said slurry holding zone.

13. A process as in claim 12 wherein the feed stock comprises a mixture of xylenes, wherein the cyclic compound is paraxylene and wherein the crystallization temperature is approximately −95° F.

14. A process as in claim 12 wherein the feed stock is a durene-containing aromatic fraction boiling between 365° and 425° F., wherein the cyclic compound is durene and wherein the crystallization temperature is approximately −60° F.

15. A process as in claim 12 wherein the feed stock comprises a cyclohexane-containing naphthenic hydrocarbon fraction, wherein the cyclic compound is cyclohexane and wherein the crystallization temperature is approximately —50° F.

16. A process as in claim 12 wherein the feed stock is a benzene-containing aromatic fraction, wherein the cyclic compound is benzene and wherein the crystallization temperature is approximately —90° F.

17. A process as in claim 12 wherein the feed stock comprises orthoxylene admixed mainly with metaxylene, wherein the cyclic compound is orthoxylene and wherein the crystallization temperature is approximately —75° F.

References Cited in the file of this patent

UNITED STATES PATENTS

| | | |
|---|---|---|
| 2,517,601 | Shafor et al. | Aug. 8, 1950 |
| 2,533,232 | Dressler | Dec. 12, 1950 |
| 2,688,045 | Powers et al. | Aug. 31, 1954 |
| 2,757,216 | Speed et al. | July 31, 1956 |